United States Patent Office 2,841,558
Patented July 1, 1958

2,841,558

HYDROCARBON OIL COMPOSITIONS

Joseph E. Fields, Dayton, and John M. Butler, Centerville, Ohio, assignors to Monsanto Chemical Company, St. Louis, Mo., a corporation of Delaware No Drawing. Application June 6, 1955
Serial No. 513,579

5 Claims. (Cl. 252—56)

This invention relates to non-foaming hydrocarbon oils and deals more particularly with hydrocarbon oils containing small amounts of certain polyvinyl esters as antifoaming agents.

The problem of foam inhibition is one of major importance to all industries employing hydrocarbon oils under foam-inducing conditions. While most oils will foam to some extent due to vigorous agitation and aeration in a running engine, foaming becomes a problem only when loss of oil occurs by foam seepage or when so many air bubbles are present in the oil that proper lubrication of bearing surfaces is impeded. Foaming is often experienced with dry sump engines in which there is employed a scavenger pump for collecting oil from various engine parts and returning it to the lubricant reservoir. Here air may be collected along with the oil and deposited in the reservoir. The design and operation of aircraft engines is such that foaming occurs more readily in this type of engine than it does in automotive engines.

New developments in engine construction have constantly demanded lubricants having properties not possessed by crude hydrocarbon oils. Such properties are now generally conferred to lubricants by the use of additives. For example, in order to satisfy the lubrication requirements of hypoid gears, materials which impart extreme-pressure resisting properties are now generally added to gear lubricants. In most cases, however, the improvement attained in an oil by the use of additives is made only at the expense of increasing its susceptibility to foam. Hence, with the development of new high-speed engines and the provision of the new additive-type lubricants, the problem of foaming has assumed major importance. Attempts to solve the problem by defoaming existing oils, e. g., by submitting oils to heat-treatment, absorption processes, filtering steps, etc., have proved of but little value. The most practical solution to this problem has been made by the use of antifoam additives.

A number of antifoam additives, i. e., antifoaming agents, foam depressing agents, foam depressants, antifrothers or foam suppressors, are known; but in prior art their use has been attended with numerous difficulties. Among disadvantage of such known additives are chemical reactivity with the lubricant or other oil additives, corrosive effect, susceptibility to decomposition upon heating, instability when exposed for long periods of time to ordinary atmospheric conditions, high cost, etc.

Now we have found that foaming of hydrocarbon oils is efficiently retarded and even completely inhibited by incorporating therein very small quantities of certain vinyl ester polymers. According to the invention there are provided compositions of reduced foaming properties consisting essentially of a hydrocarbon oil having foaming tendencies and a quantity less than 0.1 percent by weight, based on the weight of said oil, said quantity being sufficient to suppress said foaming tendency but insufficient to substantially modify the viscosity properties of said oil, of a vinyl ester polymer consisting of a vinyl ester of a fatty acid and having an average of from 4 to 8 carbon atoms in the acid portion of the polymer, a 10 percent cyclohexanone solution of said liquid polymer having a specific viscosity of from 0.25 to 1.5 at a temperature of 25° C.

Vinyl ester polymers suitable for the present purpose are, for example, polyvinyl butyrate, polyvinyl isobutyrate, polyvinyl n-valerate, polyvinyl isovalerate, polyvinyl caproate, polyvinyl 2-ethylhexoate, polyvinyl dimethylacetate, polyvinyl n-octoate, etc., of the specific viscosity noted above. Copolymers of two different vinyl esters wherein the average number of carbon atoms in the acidic portions of the esters is from 4 to 8 carbon atoms are also useful in conferring antifoamant effect according to the invention. A 10 percent cyclohexanone solution of the presently useful vinyl ester-vinyl ester copolymer must likewise have a specific viscosity of from 0.25 to 1.5 at a temperature of 25° C. The copolymer components may be a lower vinyl ester such as vinyl formate, vinyl acetate, vinyl propionate or vinyl butyrate and a higher ester such as vinyl valerate, vinyl heptoate or 2-ethylhexoate, the quantity of each component in said copolymer being such as to give an average of from 4 to 8 carbon atoms in the fatty acid portions of the copolymer molecule.

The presently useful vinyl ester polymers are obtained in known manner by solution polymerization of the monomeric vinyl esters, e. g., by maintaining solutions of the esters at moderately elevated temperatures in the presence of polymerization catalysts until formation of the polymers has been substantially completed. Solvents in which polymerization may be effected to yield the present polymeric vinyl esters are, e. g., hydrocarbons such as benzene, toluene, cyclohexane, isooctane, etc., halogenated hydrocarbons such as carbon tetrachloride, ethylene chloride or chlorobenzene, etc. Useful temperatures for effecting polymerization of the vinyl esters to give polymers of the desired viscosity range from, say, 70° C. to 110° C. Polymerization catalysts generally employed are organic or inorganic peroxidic compounds such as benzoyl peroxide, stearoyl peroxide, tert.-butyl hydroperoxide, ammonium persulfate, etc.

The present vinyl ester polymers are effective antifoaming agents when they are employed in very low proportions, i. e., in amounts of up to 0.1 percent by weight, based on the weight of the total hydrocarbon oil composition. From .001 percent to 0.05 percent of the polymer is preferred, depending upon the nature of the oil and the polymer. Heavy oils and oils containing foam-inducing adjuvants require more of the present antifoaming adducts than do base oils of good viscosity characteristics.

The antifoaming effect of the present polymers is not materially affected by the presence of other adjuvants in the oil. The polymers are stable materials which can be hydrolyzed only with difficulty, and since they are present in the oils in only very small quantities, the use of even very acidic or very basic additives in the oil has substantially no effect on the polymers. Hydrocarbon oils containing the present antifoaming agents are stable when stored over long periods of time and also when subjected to heat and pressure conditions of engine and motor operation.

Hydrocarbon oils which are rendered substantially antifoaming by incorporation therein of quantities of up to 0.1 percent of the present polymers are synthetic or petroleum stocks of varying viscosities such as lubricating oils for internal combustion engines and motors, Diesel fuels and lubricants and pressure transfer media, e. g., industrial lubricants, process oils, hydraulic oils, turbine oils, cutting oils, fluid greases, gear oils, shock absorber oils, spindle oils, journal bearing oils, pneumatic tool lubricants, etc. They may be synthetic or natural hydrocarbons of any type, i. e., paraffinic, naphthenic or blended.

The invention is further illustrated, but not limited, by the following example:

*Example*

The antifoaming properties of lubricants may be determined according to the procedure generally described in Designation L–12–445 of the Coordinating Lubricants Research Committee of the Coordinating Research Council, New York. Briefly this procedure involves bubbling air or an inert gas such as nitrogen through the hydrocarbon oil to be tested, employing standard apparatus and standard conditions.

The oil was placed in a standard 1000-ml. graduated cylinder in the top of which was inserted a two-hole rubber stopper. An air-inlet tube extended through this stopper, to the bottom of which was attached a gas diffuser or porous stone sphere. The length of the inlet tube was adjusted so that when the apparatus was assembled, the sphere just touched the bottom of the cylinder. The sphere was attached to the inlet tube by means of litharge and glycerine, or by a copper tube soldered to the diffuser-stone coupling. The oil bath used was capable of controlling temperature at $$200° \pm 1° \text{ F. } (93.3° \pm 0.6° \text{ C.})$$

large enough to permit the cylinder to be immersed at least to the 900-ml. mark, and arranged to permit the visual observation of the graduations on the cylinder.

Dry nitrogen was supplied at the rate of 0.2 cubic feet per hour, employing a calibrated flowmeter. The sample was heated to 120° F. (48.9° C.), and then cooled, before testing, to 75° ±5° F. (23.9° ±2.8° C.), in a constant temperature room; 200 cc. of oil was used for each test.

With the air hose disconnected between the flowmeter and the delivery tube to the diffuser stone, the stone was allowed to soak in the oil for 5 minutes, at the end of which time the air flow (0.2 cu. ft. per hour) was started through the stone. Zero time was noted when the air or nitrogen bubbles started to rise from the stone. Readings of the top and bottom foam levels were taken at the end of a 5-minute period. The volume of foam was calculated from the two readings.

Employing the testing procedure described above, there was determined the antifoaming effect; on Champlin 30 SAE base oil, of the following polymeric vinyl esters obtained by maintaining 30 g. of the monomeric esters in 100 cc. of toluene in the presence of the indicated quantity of benzoyl peroxide as catalyst at a temperature of 80° C. for the periods shown below:

| Polymer No. | Vinyl Ester | Specified Viscosity of 10% cyclohexanone solution of polymer at 25° C. | Catalyst, g. | Heating time |
|---|---|---|---|---|
| 1 | Butyrate | 0.82 | 1.5 | 24 |
| 2 | Caproate | 0.61 | 1.5 | 24 |
| 3 | 2-Ethylhexoate | 0.64 | 0.6 | 48 |

For isolation of polymers Nos. 1 and 2, the reaction mixture was stripped by heating at 180° C. at a maximum pressure of 15 mm. of mercury. For isolation of polymer 3, stripping by heating to 180° C. at 4 mm. of mercury pressure was used.

The following evaluation data was obtained:

| Additive Polymer No. | Foam (cc.) at 5 min. Additive in Parts Per Million of Oil | | | | | |
|---|---|---|---|---|---|---|
| | None | 200 p. p. m. | 150 p. p. m. | 100 p. p. m. | 50 p. p. m. | 20 p. p. m. |
| None | 790 | | | | | |
| 1 | | 10 | 280 | 700 | | |
| 2 | | | 0 | 0 | 5 | 20 |
| 3 | | 0 | | 5 | 270 | |

Nonfoaming hydrocarbon oil compositions may be obtained by incorporating into such oils in a quantity of up to 0.1 percent, based on the weight of the composition, other of the present liquid polymers. Instead of the vinyl butyrate, vinyl caproate or the vinyl 2-ethylhexoate of the above example there may be employed, e. g., vinyl isobutyrate, vinyl valerate, etc., or a copolymer of two different vinyl esters having an average of from 4 to 8 carbon atoms in the acidic portion of the esters, e. g., a copolymer of vinyl acetate and vinyl n-octoate, of vinyl butyrate and vinyl caproate, of vinyl propionate and vinyl n-heptoate, etc. The present liquid polymers impart antifoaming properties to hydrocarbon oils generally in the presence or absence of other customarily employed additives such as extreme pressure imparting additives, detergent additives, etc.

This is a continuation-in-part of our application, Serial No. 269,601, filed February 1, 1952, now abandoned.

What is claimed is:

1. A hydrocarbon oil composition of reduced foaming properties consisting essentially of a hydrocarbon oil having foaming tendencies and a quantity less than 0.1 percent by weight, based on the weight of said oil, said quantity being sufficient to suppress said foaming tendencies but insufficient to substantially modify the viscosity properties of said oil, of a vinyl ester polymer consisting of a vinyl ester of a fatty acid and having an average of from 4 to 8 carbon atoms in the acid portion of the polymer, a 10 percent cyclohexanone solution of said liquid polymer having a specific viscosity of from 0.25 to 1.5 at a temperature of 25° C.

2. A hydrocarbon oil composition of reduced foaming properties consisting essentially of a hydrocarbon oil having foaming tendencies, and a quantity less than 0.1 percent based on the weight of said oil, said quantity being sufficient to suppress said foaming tendencies, but insufficient to substantially modify the viscosity properties of said oil, of a polyvinyl ester of a fatty acid having from 4 to 8 carbon atoms in the acid portion of the polymer, a 10 percent cyclohexanone solution of said polymer having a specific viscosity of from 0.25 to 1.5 at a temperature of 25° C.

3. A hydrocarbon oil composition of reduced foaming properties consisting essentially of a hydrocarbon oil having foaming tendencies and a quantity less than 0.1 percent based on the weight of said oil, said quantity being sufficient to suppress said foaming tendencies, but insufficient to substantially modify the viscosity properties of said oil, of a polymeric vinyl butyrate, a 10 percent cyclohexanone solution of said polymer having a specific viscosity of from 0.25 to 1.5 at a temperature of 25° C.

4. A hydrocarbon oil composition of reduced foaming properties consisting essentially of a hydrocarbon oil having foaming tendencies and a quantity less than 0.1 percent based on the weight of said oil, said quantity being sufficient to suppress said foaming tendencies but insufficient to substantially modify the viscosity properties of said oil, of a polymeric vinyl caproate, a 10 percent cyclohexanone solution of said polymer having a specific viscosity of from 0.25 to 1.5 at a temperatuer of 25° C.

5. A hydrocarbon oil composition of reduced foaming properties consisting essentially of a hydrocarbon oil having foaming tendencies and a quantity less than 0.1 percent based on the weight of said oil, said quantity being sufficient to suppress foaming tendencies, but insufficient to substantially modify the viscosity properties of said oil, of a polymeric vinyl 2-ethylhexoate, a 10 percent cyclohexanone solution of said polymer having a specific viscosity of from 0.25 to 1.5 at a temperature of 25° C.

References Cited in the file of this patent

UNITED STATES PATENTS 2,091,627    Bruson _____ Aug. 31, 1937

FOREIGN PATENTS 698,013    Great Britain _____ Oct. 7, 1953
710,732    Great Britain _____ June 16, 1954

OTHER REFERENCES

"Ind. & Eng. Chem.," vol. 43, No. 9, page 2107 pertinent.